United States Patent [19]
Lunsford et al.

[11] 3,718,946
[45] March 6, 1973

[54] QUICK RELEASE CARGO TIE DOWN

[75] Inventors: Waymond S. Lunsford, Clayton; Max W. Watts, Tiger; Kenneth W. Mason, Clayton, all of Ga.

[73] Assignee: The Aid Corporation, Clayton, Ga.

[22] Filed: Nov. 3, 1971

[21] Appl. No.: 195,204

[52] U.S. Cl. ..........24/73 HH, 24/68 CT, 24/241 SB, 105/369 A, 248/361 A
[51] Int. Cl. ......................A43c 11/00, B65d 63/00
[58] Field of Search ......24/241 PP, 241 SB, 241 CH, 24/68 CD, 73 CE, 73 HH, 73 HR, 68 CT; 248/361 A, 361 R; 105/369 A, 369 R

[56] References Cited

UNITED STATES PATENTS

| 679,088 | 7/1901 | Methven | 24/241 SB |
|---|---|---|---|
| 3,173,539 | 3/1965 | Looker | 105/369 A X |
| 3,366,997 | 2/1968 | Lesley | 24/68 CT |

*Primary Examiner*—Donald A. Griffin
*Attorney*—Edward Taylor Newton et al.

[57] ABSTRACT

A quick release cargo tie-down device for use in securing a link of a cargo tie-down chain in position relative to stationary anchor means. The cargo tie-down device includes a pair of block members defining opposing socket portions detailed in dimensions for receiving opposite arcuate end portions of a chain link, with the block members being movable relative to each other for operation between a closed chain link retaining position and an opened chain link releasing position. Latching lever means is operatively associated with the block members for preventing relative displacement of the block members, to thereby latch the block members in the chain link retaining position. The quick release cargo tie-down device includes two latch releasing lever means operable independently of each other, with one of the latch releasing levers being operable for effecting release of the latching lever to permit a chain link to be removed from the opposed socket means when the cargo tie-down device is not under tension and with the second latch releasing lever being operable for effecting the release of the chain when the device is operating under tension. A single spring means is operatively associated with the latching lever and the latch releasing levers for biasing the latching lever to a latched position and for biasing the latch releasing levers to inoperable positions. The quick release cargo tie-down device includes a selectively adjustable collar means having an internally threaded opening operable for receiving externally threaded means of a hook member, with the selectively adjustable collar means operable for effecting displacement of the hook member relative to the chain retaining block members, whereby the effective tension applied to a cargo tie-down chain can be adjusted.

13 Claims, 5 Drawing Figures

QUICK RELEASE CARGO TIE DOWN

BACKGROUND OF THE INVENTION

This invention relates to a quick release cargo tie-down device operable for securing cargo in a fixed position within an aircraft during transport. More particularly, this invention includes a quickly connectible and disconnectible chain link attaching means operable for securing a cargo tie-down chain in a fixed position relative to a selectively adjustable hook tensioning device.

Due to the fast delivery of air cargo, aircraft is used more and more in the shipment of goods between various locations. In the shipment of cargo by air, it is necessary to securely lock the cargo in a fixed position relative to the aircraft during transport in order to render the aircraft safely operable during takeoff, flight and landings.

Cargo tie-down means must be both light in weight and sufficiently strong to insure that the cargo transported will be securely held in a fixed position. A cargo tie-down device must include means for quickly and releasably attaching cargo tension means such as a chain and must include means for adjusting the tension applied to the tension means.

A number of attempts have been made to provide quick connectible and disconnectible cargo tie-down devices for use in aircraft in the shipment of cargo. However, the prior art cargo tie-down devices are extremely complex in construction, uneconomical to manufacture and time consuming in utilization. The prior art chain link cargo tie-down devices were difficult to install for the reason that the links of a chain could not easily be positioned relative to link attachment means and after the chain links were attached, the prior art releasing means rendered these mechanisms difficult to unlatch after a tension had been applied to the cargo tie-down device.

Further, the prior art cargo tie-down devices included a single lever means for releasing the chain latching mechanism which latch releasing mechanism was constructed to securely latch a chain link under tension and was difficult to operate to render the mechanism operable for releasing a chain. Certain of the prior art chain link cargo tie-down devices include hook means for engaging the space between adjacent link members. However, these hook members cannot be utilized with small chains which do not have sufficient space between the adjacent links for receiving the hook members.

Due to the complex construction of the prior art quick release cargo tie-down devices, these devices include an excessive number of parts decreasing their reliability and increasing their maintenance cost.

SUMMARY OF THE INVENTION

The above disadvantages of the prior art have been overcome by the present invention which basically includes a pair of support plate members adapted to be connected in substantially spaced parallel relationship with a fixed block member having a recessed socket secured between the support plate members adjacent one end and including a movable block member having an opposed recessed socket means, wherein the two socket means are operable for receiving and securely holding a chain link. The movable block member is provided with a releasable latching lever for holding the movable block in a latch chain retaining position with the latch being operable for permitting the movable block member to move to an open or unlatched position whereby a chain link can be inserted or easily removed therefrom.

One important feature of the present invention includes the provision of two latch releasing levers, one of the latch releasing levers being operable for releasing an engaged chain, when the chain and quick release cargo tie-down device is operating under tension and with the second latch releasing lever being operable for releasing an engaged chain, when the device is not operating under tension.

An additional important feature of the present invention resides in the simplicity of the construction wherein a single pivot means supports the latching lever, and both of the latch releasing levers.

An additional simplicity of the construction resides in the fact that a single spring provides a biasing force for performing three biasing actions, one biasing action operable for biasing the latching lever to a latched position, a second biasing action operable for biasing the first latch releasing lever to an inoperable position and a third biasing action operable for biasing the second latch releasing lever to an inoperable position.

Another important feature of the present invention resides in the fact that the apparatus includes a selectively adjustable collar means operatively associated with a hook member, the hook member being operative for securing the tie-down device to anchor means, and with the selectively adjustable collar means being operable for varying the effective length of the cargo tie-down device to increase or decrease the tension on a tie-down chain. The selectively adjustable collar means is operatively associated with the second latch releasing lever for serving as a latch to maintain the latch releasing lever in a latched inoperable position and the second latch releasing lever is also operable with the adjustable collar mechanism for providing a latching member for holding the selectively adjustable collar in a selected adjusted position.

The above features of the present invention permits the construction of a quick release cargo tie-down device which is light weight, simple in construction and operation, economical to manufacture and reliable in performance.

These and other objects and advantages of the details of construction will become apparent upon reading the following description of the illustrative embodiment of the present invention with reference to the attached drawings wherein like reference numerals have been used to refer to like parts throughout the several figures, and wherein:

DESCRIPTION OF THE ILLUSTRATIVE EMBODIMENTS

Referring now to the drawings, the quick release cargo tie-down device embodying the principles of the present invention is generally represented by the reference numeral 10 (FIG. 1) and will be described with reference to a pair of plate support members 11, 12; a chain engaging and retaining block assembly 13; a latch and latch releasing assembly 14; and a selectively adjustable hook engaging assembly 15.

The function of the plate members 11, 12 is to provide rigid structural members for holding the chain engaging block assembly 13, latch releasing assembly 14, and hook engaging assembly 15 in an assembled operable relationship.

The function of the chain engaging block assembly 13 is to provide a selectively adjustable assembly which is operable for engaging and retaining the link of a cargo tie-down chain in a secured position and being operable to permit adjustment of the block assembly for releasing the link of a chain.

The function of the latch and latch release assembly 14 is to provide means for controlling operation of the chain engaging block assembly between the latched chain retaining position and the open chain release position.

The function of the selectively adjustable hook assembly 15 is to provide means for attaching an opposite end portion of the cargo tie-down device to an anchor support and being operable for selectively adjusting the effective length of the quick release cargo tie-down device for increasing and decreasing tension on the chain used in a cargo tie-down operation.

Figure 1:
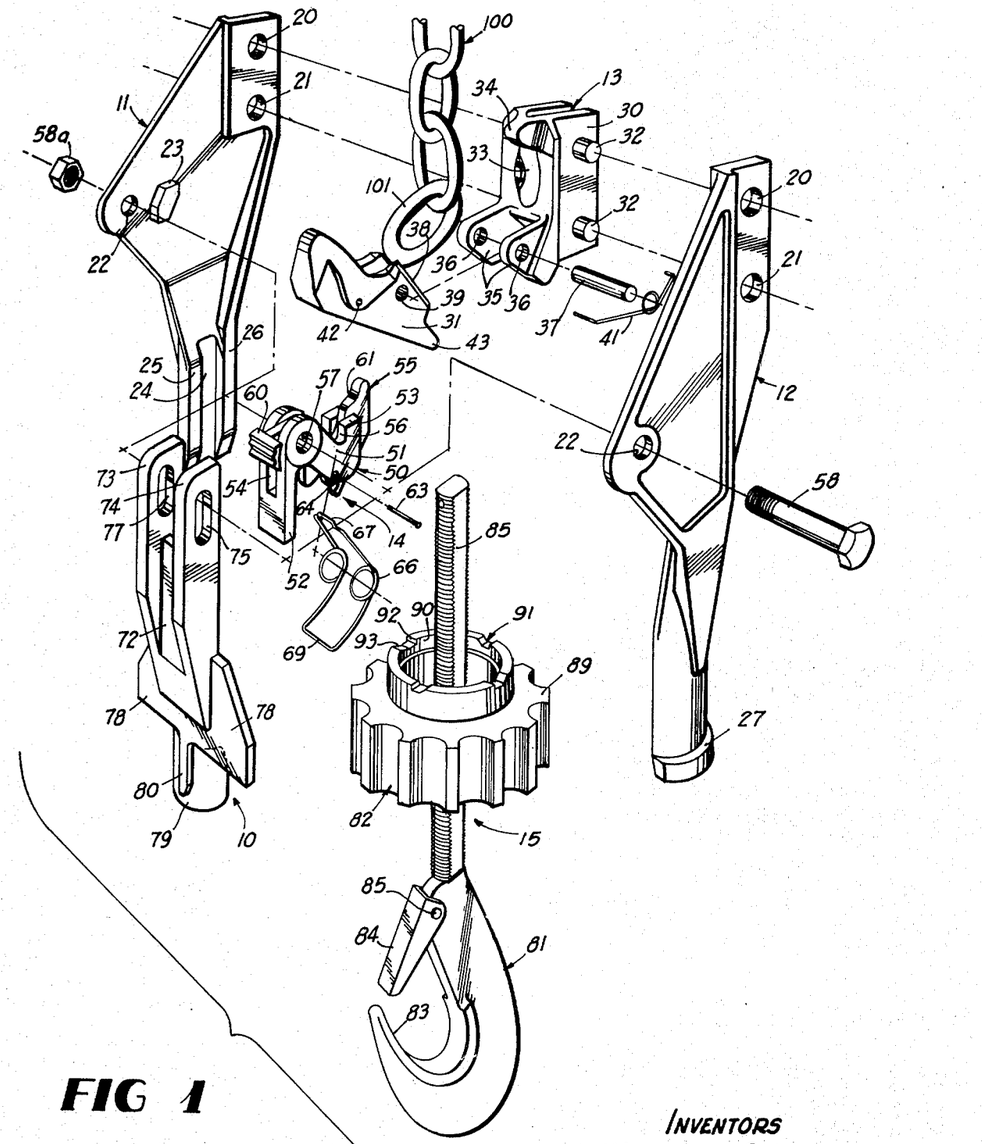
FIG. 1 is an exploded perspective view illustrating the disassembled parts of a quick release cargo tie-down device embodying the principles of the present invention.

As shown in FIG. 1, each of the plate support members 11, 12 is provided with a first end portion having a pair of spaced support openings 20, 21. Located below and slightly to the left of openings 20, 21 (as shown in FIG. 1), plate support members 11, 12 are provided with an additional opening 22. In an assembled relationship openings 20–22 are adapted to be aligned whereby openings 20 of each of the plate members are coaxially aligned, openings 21 are coaxially aligned, and openings 22 are coaxially aligned. Provided on the inner surface of plate members 11, 12 are laterally projecting spacing lug members 23 (only one of which is shown in FIG. 1 of the drawing, however, it is to be understood that plate member 22 would have a similar spacing lug member projecting laterally to the left.) The support plate members 11, 12 are provided with a second end opposite from the openings 20, 21 which includes an elongated recess 24 defined by a pair of upstanding shoulder portions 25, 26. The recess portion 24 is operable for defining a passageway for an adjustable portion of the hook assembly 15, as will be described in more detail hereinbelow. The lower or bottom end of the plate members 11, 12 (FIG. 1) are provided with flange members 27. Flange members 27 are operable for engaging shoulder portions of an annular recess of the hook engaging assemblies for retaining the hook engaging assembly in an operable position relative to the support plate members, as will be described in more detail hereinbelow.

Figures 2, 3:
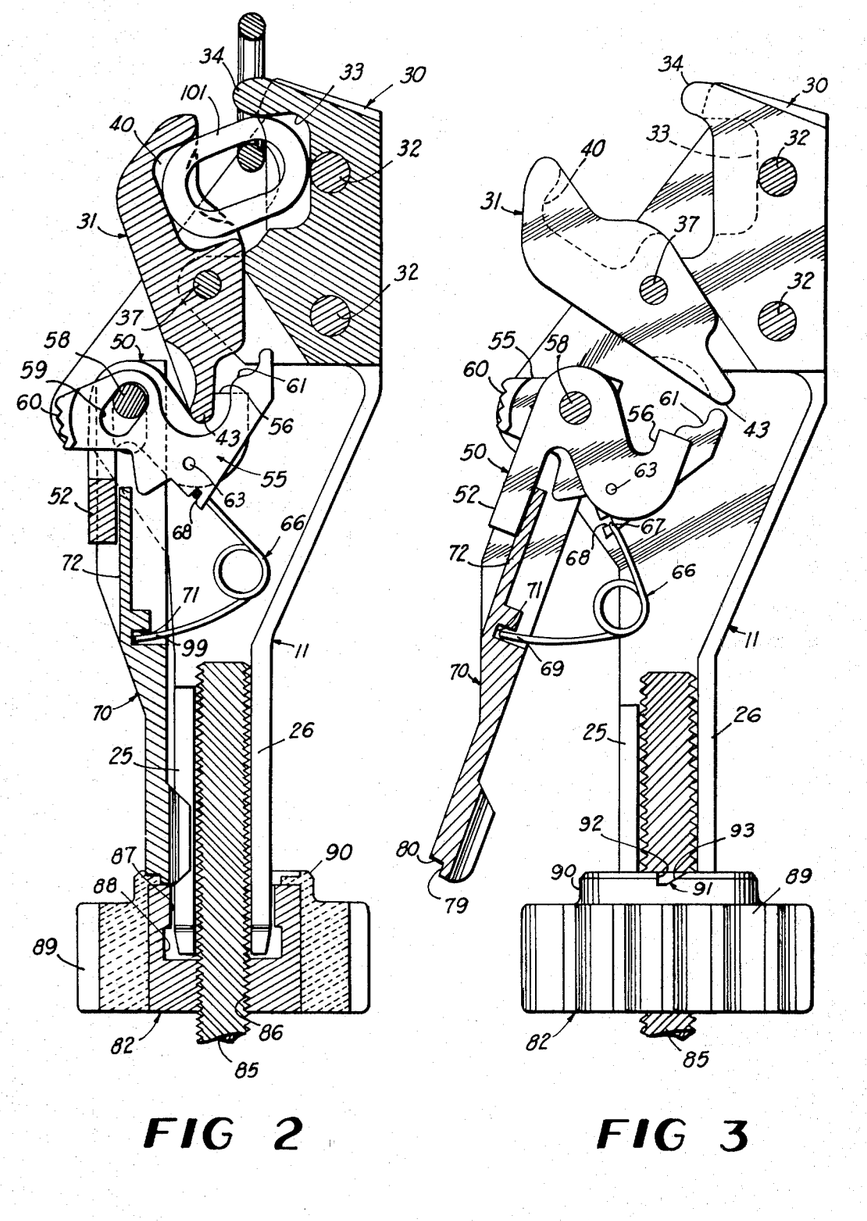
FIG. 2 is a longitudinal cross sectional view of the cargo tie-down device shown in FIG. 1, shown assembled, with certain parts being omitted for purpose of clarity, and illustrating the latching mechanism in a chain link engaging and retaining position.
FIG. 3 is a longitudinal cross sectional view similar to FIG. 2 showing the latch release mechanism moved to an operable position permitting the latch and chain engaging mechanism to move to an open unlatched position, with certain parts being omitted and certain parts being added thereto for purpose of clarity.
Figure 4:
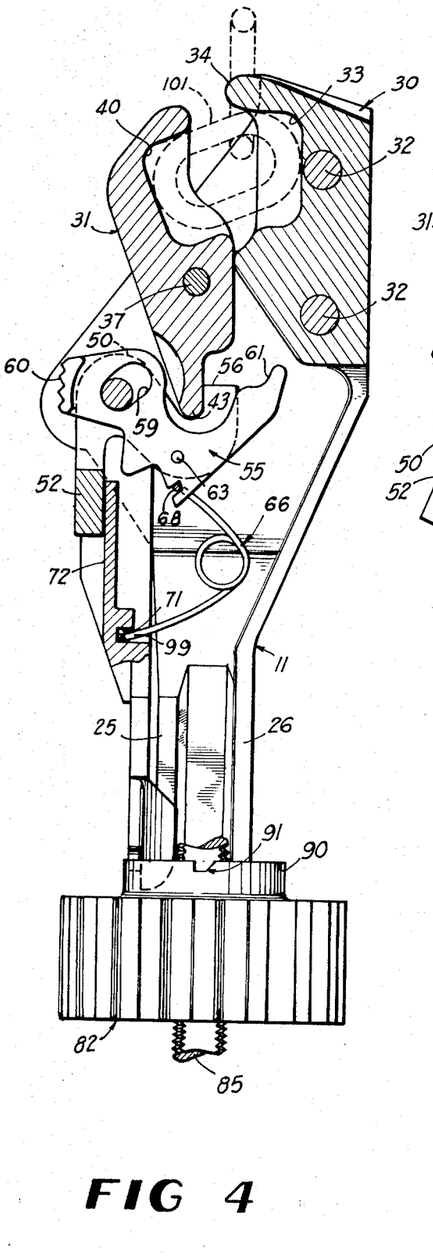
FIG. 4 is a longitudinal cross sectional view similar to FIG. 2 showing an additional one of the latch releasing levers moved to an adjusted position.

As shown in FIG. 1, the chain attachment assembly 13 includes a first chain receiving block 30 and a second chain receiving block 31. Chain receiving block 30 is secured between the plate members 11, 12 in a fixed position by a number of laterally projecting studs 32. Laterally projecting studs 32 are detailed in dimension to be received by coaxially aligned openings 20, 21. Block 30 includes parallel arranged side portions which are adapted to be in abutting engagement with parallel arranged side portions of plate members 11, 12 whereby the plates are substantially parallel arranged relative to each other. The fixed block 30 includes a recessed chain receiving socket 33. Chain receiving socket 33 is detailed in dimension for receiving and retaining an arcuate end portion of a chain link, as shown in FIG. 2. As shown in FIGS. 1 and 2, a forward upper edge of the block 30 is provided with an upstanding projection 34. Projection 34 is detailed in dimensions and location to be received within a chain link, as shown in FIG. 2.

The upper rear edge of block member 30 is provided with a pair of horizontally spaced upstanding tabs 35. Upstanding tabs 35 define coaxially aligned openings 36. Openings 36 are detailed for receiving a pivot support pin 37. Pin 37 is detailed in dimensions and complementary to openings 36 and will serve as a pivot support member for the movable chain receiving block 31.

As shown in FIG. 1, the movable chain receiving block 31 is provided with a projecting portion 38 detailed in dimensions to be received between upstanding tabs 35. Projection 38 is provided with an opening 39 adapted to receive pivot pin 37 whereby the chain receiving block 31 can be pivotally supported on the fixed chain receiving block 30. As shown in FIGS. 2 and 3, the pivotally mounted chain receiving block 31 is provided with a recessed socket 40. Recessed socket 40 is detailed in dimensions for receiving an opposite arcuate end portion of a chain link for securing a chain, as shown in FIG. 2. In an assembled relationship, the pivotal mounting block socket 40 is in opposed relationship relative to socket 33 of the fixed chain receiving block. The pivotally mounted chain receiving block 31 is operatively associated with the fixed chain receiving block 30 whereby the opposed sockets 33, 34 can be positioned in a closed chain link retaining position (FIG. 2) or can be moved to an adjusted open chain link release position (FIG. 3).

The pivotally mounted chain receiving block 31 is spring biased to an open position (FIG. 3) by means of a torsion spring element 41. Spring element 41 includes a loop portion adapted to surround pivot pin 37 with a pair of projecting arm portions. One of the arm portions is adapted to engage and be retained by an opening 42 provided in the pivotally mounted chain receiving block 31 and an opposite arm adapted to engage a lateral surface on block 30 whereby the spring 41 will be operable for biasing chain receiving block member 31 to the open position (FIG. 3). The pivotally mounted chain receiving block 31 includes a rearwardly extending latching projection 43 having a latching surface portion located therebeneath for cooperation with a latching lever 50, as will be described hereinbelow.

As shown in FIG. 1, the latching assembly 14 includes a substantially S-shaped latching lever 50. Latching lever 50 is provided with an intermediate body portion 51 and a pair of extending substantially parallel arranged oppositely directed end portions 52, 53. The S-shaped latching lever 50 is provided with an elongated slot means 54 which extends throughout the length of the intermediate body member 51, arm 53 and a portion of the arm 52. The elongated slot means 54 receives and movably supports a first latch releasing lever 55. Latching lever arm 53 is designed to provide a latching surface 56 for latching engagement with latch projection 43 formed on the pivotal chain receiving block 31. As shown in FIG. 1, an opening 57 is provided in latching lever 50 at the point of intersection of intermediate body member 51 and end portion 52. Opening 57 is provided for receiving a pivot connecting bolt means 58, as will be described in more detail hereinbelow. The first latch releasing lever 55 includes an elongated slot 59. Slot 59 is provided for receiving the pivot connecting bolt means 58. Latch releasing lever 55 includes an upstanding gripping arm 60 to be used for effecting displacement of the latch releasing lever 55 in moving the latching lever from a latched to an unlatched position. Latching lever 55 is formed to define a downwardly extending camming end portion 61 operable for guiding projection 43 of the movable chain receiving block to a latched position.

As shown in FIGS. 1-3, a pivotal connection is made between latching lever 50 and latch releasing lever 55 by means of a connecting pin 63. Connecting pin 63 is inserted through an opening 64 on the S-shaped lever 50 and opening 65 on latch releasing lever 55. The elongated slot 59 will permit limited pivotal movement of the latch releasing lever 55 relative to latching lever 50, but will thereafter effect a pivotal displacement of the latch releasing lever 50. Latching lever 50 is spring urged to a latch engaging position and latch releasing lever 55 is urged to an inoperable position by a single torsion spring means 66. Torsion spring 66 includes a first leg 67 operable for engaging an upstanding notch 68 on the latch releasing lever 55. Spring 66 includes a second leg 69 detailed for engagement with a second latch releasing lever 70. As shown in FIG. 2, the second latch releasing lever 70 includes a downwardly directed recessed notch 71 detailed for receiving spring leg 69.

The second latch releasing lever 70 includes a body portion 72 having a pair of forwardly projecting parallel arranged sides 73, 74. The forward end of sides 73, 74 are provided with coaxially aligned elongated slot means 75. Forwardly projecting sides 73, 74 are detailed in lateral spacing to straddle opposite sides of the latching lever 50. In an assembled relationship, the forwardly projecting sides 73, 74 will extend on opposite sides of the latching lever 50 and the bolt connecting pivot means 58 is inserted through opening 22 of plate member 12, through openings 75 of one member 74, through a first opening 57 of the latching lever 50, through the elongated slot 59 of the first latching releasing lever 55, through the second opening 57 of latching lever 50, through the elongated opening 75 of side 73 and thereafter through the opening 22 provided in plate member 11. The plate members 11, 12 are maintained in an assembled relationship by means of a tap 58a which is adapted to be threadably locked in position on the connecting bolt means 58.

As shown in FIGS. 2 and 3, when the latching assembly 13 is in an assembled relationship, leg member 52 of latching lever 50 extends rearwardly and overlies body member 72 of latch releasing lever 70. The second latch releasing lever 70 includes a pair of laterally extending gripping handles 78 which will permit an operator to firmly grasp and operate the latch releasing lever 70. The lower depending end of latch releasing lever 70 provides an arcuate shaped latching surface 79 detailed for cooperation with an adjustable collar member 82 on the hook engaging assembly 15, for maintaining the second latch releasing lever in a latched position. Also provided on the lower end of latch releasing lever 70 is a radially projecting latching element 80. Radially projecting latching element 80 is operatively associated with the adjustable collar member 82 for holding the adjustable collar in a selected adjusted position, as will be described in more detail hereinbelow.

In an assembled relationship, the latch releasing lever 70 is bodily shiftable on connecting bolt means 58, whereby the bolt means 58 is received within opposite end portions of the elongated slot means 75, 77. With the connecting bolt means 58 received in the top portion of the slots 75, 77 (FIG. 1) the latch releasing lever 70 is held by the adjustable collar member in a locked position. Movement of the lever 70 upward whereby the connecting bolt 58 is received in the bottom of the slots 55, 57, permits pivotal displacement of the latch releasing lever 70 to thereby pivot the latching lever 50 to an unlatched position (FIG. 3). The latch releasing lever 70 is spring biased to an inoperable position with the receiving bolt 58 contained in the top portion of the slot 75, 77 by spring means 66.

As shown in FIGS. 1 and 2, the cargo tie-down device adjustable hook assembly 15 includes a hook member 81 and a collar member 82. Hook member 81 includes a hook receiving slot 83 having a conventional latching element 84 operatively associated therewith. Latching element 84 is secured to the hook member 81 about pivot means 85. The latching element 84 is pivotally movable to a displaced position permitting a connecting element to be inserted in the hook receiving slot 83 and is then spring biased by conventional spring means (not shown) to a latching position whereby the connecting element will be maintained in the hook receiving slot. Formed integrally with and extending upwardly from the hook member 81 is an elongated externally threaded shank 85. Shank 85 is threadably received within a complementary threaded opening 86 of the adjustable collar 82. The externally threaded shank member 85 and internally threaded opening 86 will permit adjustment of collar 82 relative to the hook receiving end 83, whereby the effective length of the hook member 81 can be selectively adjusted.

As shown in FIG. 2, adjustable collar 82 is provided with a second opening 87 coaxially formed relative to opening 86. Opening 87 is detailed in dimension to allow the radial flanges 27 of plate members 11, 12 to pass therethrough when the threaded shank member is not threaded in opening 86. An annular groove 88 is formed in collar 82 coaxial with openings 86, 87. Annular groove 88 is slightly larger in diameter than opening 87 and is detailed for receiving the radial flanges 27 when the threaded shank member 85 is threadably received within openings 86. The shoulders of radial flanges 27 will engage complementary shoulder portions of annular groove 88 to thereby prevent axial displacement of the collar 82 relative to plate members 11, 12. In assembling the hook assembly 15 on the plate members 11, 12, the threaded shank member 85 is removed from collar 82, the radial flanges 27 of plate members 11, 12 are inserted through opening 87 prior to securely tightening the bolt connecting means 58. Prior to tightening the bolt connecting means 58, the lower end portions, including radial flanges 27 of plates 11, 12, can be radially displaced inwardly relative to each other whereby radial flanges 27 can be inserted through openings 87. After the radial flanges 27 are inserted through opening 87, the radial flanges are moved radially outward into engagement with annular groove 88. After radial flanges 87 are located in position within annular groove 88 the threaded shank member 85 is threadably received within opening 86. In axial movement of the threaded shank member 85 through the collar opening 86, the threaded shank member will be permitted to pass upwardly through the elongated slot 24 defined between plate shoulders 25, 26. Thus, after the adjustable collar assembly 15 is positioned relative to plates 11, 12, the threaded shank member 85 will assist in maintaining flanges 27 radially displaced outward within annular groove 88. The radial flanges 27 will cooperate with annular groove 88 to maintain the plate members 11, 12 in a fixed axially set position relative to adjustable collar 82. Adjustable collar 82 is provided with a plurality of radially extending gripping members 89 which will permit an operator to grasp and easily rotate the adjustable collar to effect the axial adjustment of hook member 81.

Figure 5:
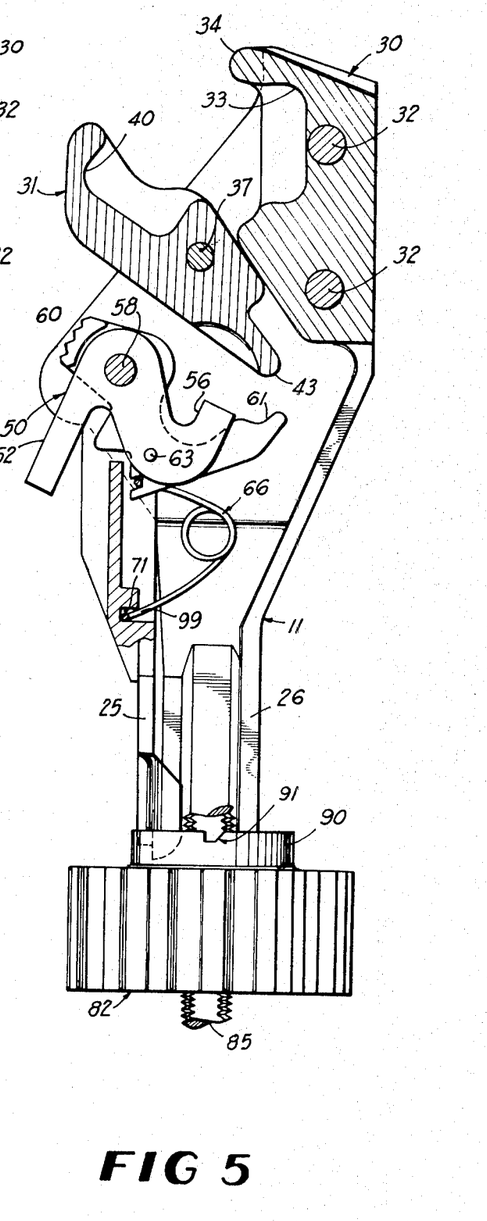
FIG. 5 is a longitudinal cross sectional view showing the latch mechanism of FIG. 4 moved to an unlatched chain releasing position.

As shown in FIGS. 2–5, the second latch releasing lever 70 is operatively associated with the adjustable collar 82 whereby the arcuate shaped end portion 79 will be received within an axially extending flange 90. Flange 90 is formed integrally with the adjustable collar 82 in coaxial relationship with openings 86, 87. When the arcuate end portion 79 is received within the axially extending flange, as shown in FIG. 2, flange 90 will operate to engage arcuate end portion 79 for latching and holding the latch releasing lever 70 in an inoperable position. As shown in FIG. 1, the axially extending end of flange 90 is provided with a plurality of notches 91. Each of the notches 91 includes a blocking surface 92 and a camming surface 93. Blocking surface 92 is detailed to extend substantially parallel to the axis of the adjustable collar wherein the camming surface 93 is detailed to be angularly disposed relative to the axis of the collar. The plurality of notches 91 are operatively associated with the radially projecting lug 80 on latch releasing lever 70 to thereby latch the adjustable collar in selectively set positions. Camming surface 93 will cooperate with radial projection 80 to bias the latching lever 70 upwardly against tension spring 66 to permit rotation of the adjustable collar 82 in one direction. The projection 80 is spring biased axially into notches 91 and will cooperate with blocking surfaces 92 to prevent rotation of the adjustable collar 82 in an opposite direction. However, adjustable collar 82 can be rotated in either a tension applying or a tension releasing position by moving the latch releasing lever 70 to an open position, as shown in FIG. 5.

The above described illustrative embodiment of the quick release car tie-down device is constructed of conventional light weight metal stock material such as aluminum or magnesium, with the rotatable collar member 82 having a portion thereof formed of suitable synthetic material such as nylon or plastic.

OPERATION

In utilizing the quick release cargo tie-down device embodying the principles of the present invention, the various component parts including plates 11, 12 block assembly 13, releasable latch assembly 14 and adjustable hook assembly 15 are assembled in the manner described. To utilize the quick release cargo tie-down device, the hook member 81 is attached to a suitable anchor means, such as a retaining ring (not shown) and the releasable block assembly 13 is attached to one of the links 101 of the cargo tie-down chain 100. In attaching the block assembly 13 to a link 101, block element 31 is moved to an open position, as shown in FIGS. 3 & 5. With block 31 in an open position, a link 101 is inserted within the sockets 33, 40 and then movable block member 31 is rotated to a closed chain link retaining position and securely held in the retaining position by latching lever 50.

After chain 100 has been secured between blocks 30, 31 the tension on the chain can be varied by rotating the adjustable collar 82 clockwise, as shown in FIG. 2. Rotation of collar 82 clockwise will permit axial displacement of projection 80 by camming surface 93. Clockwise rotation of the adjustable collar 82 will advance the threaded shank member 85 upwardly through the collar 82 and into the slot 24 defined between plate members 11, 12. An axial displacement of threaded shank member 85 will effect a corresponding movement of hook engaging member 81, thereby applying increasing amounts of tension to the chain 101. Adjustable collar 82 is continuably rotated until the desired tension is applied to chain 100. After the desired amount of tension has been obtained, the blocking surface 92 of notches 91 will prevent the adjustable collar from accidentally rotating in an opposite direction to relieve the tension.

When the movable block member is in a closed chain link retaining position, latching lever 50 is moved forward to a position as shown in FIGS. 2 and 3 with the projecting latch surface 43 in engagement with surface 56 of latching lever 50. Latching lever 50 is operable in the latched position to securely hold block member 31 in a closed position for retaining the chain link 101 between sockets 33, 40. In moving the blocking member 31 to an open chain link releasing position, either of the latch releasing levers 55 or 72 can be utilized. When a tension is applied to chain 101, latch releasing lever 70 must be used. In utilizing latch releasing lever 70, the lever 70 is first bodily displaced to the right (as shown in FIG. 2) whereby slots 75, 70 will be displaced relative to the connecting bolt means 58. Slots 75, 77 are detailed in dimension to permit the latch releasing lever 70 to be displaced a sufficient amount to permit the arcuate latching surface 79 to be disengaged from beneath the axial flange 90. After latching lever 70 has been disengaged from a latched position relative to flange 90, the latching lever is rotated clockwise as shown in FIGS. 2 and 3. A clockwise rotation of latch releasing lever 70 will cause body portion 72 to contact the rearwardly extending leg 52 of the latching lever. A continued clockwise displacement of latch releasing lever 70 will effect a corresponding clockwise displacement of the latching lever 50 to displace the lever latching surface 56 from beneath the latching projection 43. After the latching surface 53 has been displaced relative to projection 43, spring 41 will bias block member 31 to an open position (FIG. 3) whereby the chain link 101 can be released therefrom. After the latch releasing lever 70 has been operated in a manner described above for releasing a chain link 101, the latching mechanism can be returned to a latching position by effecting a counterclockwise displacement of the latch releasing lever 70 which will in turn cause spring means 66 to effect a counterclockwise displacement of the latching lever 50.

If it is desired to release the movable block member 31 from a closed position when the device is not operating under tension, the first latch releasing lever 55 is operated to effect opening of the chain retaining block 31. Lever 55 is moved by the operator engaging the projection portion 60, effecting a clockwise displacement of latch releasing lever 55 about pivot pin means 65. Slot 59 will permit a limited amount of displacement of the latch releasing lever 55, after which the opposite end of the slot 59 will contact the pivot bolt means 58. A continued movement of the latch releasing lever 55 after the upper edge of slot 59 has contacted pivot bolt means 58, will effect a corresponding clockwise displacement of the latching lever 50, for disengaging the latching surface 56 from the latching projection 43 in the same manner as described above in regard to the latching releasing lever 70. Latching lever 50 and latch releasing lever 55 are returned to the normal closed latching position by spring means 66.

The use of the single pivot means for supporting the latching lever 50, the two latch releasing levers 55 and 70, along with the utilization of a single spring means 66 operatively associated with the latching lever and the two latch releasing levers, simplifies the design to a minimum number of parts. The operative association of latch releasing lever 70 with the adjustable collar 82 for performing the two functions, one being to hold the latch releasing lever in a latched inoperable position and the second being to hold the adjustable collar in selectively set positions, will also add to the simplicity of design of a quick release cargo tie-down device.

It now becomes apparent that the above described illustrative embodiment of a quick release cargo tie-down device is capable of obtaining the above stated objects and advantages. It is obvious that those skilled in the art may make modifications in the details of construction without departing from the spirit of the invention which is to be limited only by the scope of the appended claims.

What is claimed is:
1. Apparatus for releasably attaching a cargo tie-down chain in position relative to stationary anchor means comprising, in combination:
   a. means on said apparatus for defining a fixed receiving socket, said fixed receiving socket detailed in dimensions for receiving a portion of a link of a tie-down chain;
   b. means on said apparatus for defining a movable receiving socket, said movable receiving socket detailed in dimensions for receiving a portion of said link of said tie-down chain;
   c. means for movably supporting said movable receiving socket in operative association relative to said fixed receiving socket whereby said movable socket can be moved to a closed position for latching and securing a chain link in position between said two sockets, with said movable socket capable of being moved to an adjusted position permitting said chain link to be released from said sockets;
   d. latching lever means on said apparatus operatively associated with said movable socket for latching said movable socket in a closed chain link retaining position, said latch means being selectively movable between a latching position and a latch release position;
   e. spring means operatively associated with said latching lever for spring biasing said latching lever to said latched position;
   f. a first latch release lever movably supported on said apparatus and operatively associated with said latching lever for moving said latching lever to a displaced unlatched position; and,
   g. a second latch release lever movably supported on said apparatus and operatively associated with said latching lever for moving said latching lever to said displaced unlatched position, said first latch release lever being operable independently of said second latch release lever.

2. Apparatus for releasably attaching a cargo tie-down chain as defined in claim 1 further characterized in that a single independent spring means is operatively associated with said first and second latch releasing levers and said latching lever for simultaneously biasing said latch releasing levers to inoperable positions and for biasing said latching lever to latch operable position.

3. Apparatus for releasably attaching a cargo tie-down chain as defined in claim 1 further characterized in that said apparatus includes pivot means for supporting said first and second latch releasing levers for coaxial pivotal movement between operable and inoperable positions.

4. Apparatus for releasably attaching a cargo tie-down chain as defined in claim 1 further characterized in that said apparatus includes additional latching means operatively associated with said second latch releasing lever for retaining said second latch releasing lever in an inoperable position, and wherein second latch releasing lever is bodily displaceable relative to said additional latching means to permit movement of said second latch releasing lever to an operable position.

5. Apparatus for releasably attaching a cargo tie-down chain as defined in claim 1 further characterized in that said movable chain receiving socket means includes a projecting latching surface, and wherein said latching lever means includes a latch blocking surface, with said latching lever means being operatively associated with said projecting latching surface whereby said latch lever blocking surface is movable from a latched position to an unlatched position along a path of movement complementary to said projecting latching surface.

6. Apparatus for releasably attaching a cargo tie-down chain as defined in claim 5 further characterized in that said latching surface of said movable socket receiving means includes an arcuate shaped end portion and wherein said latching lever is pivotally supported relative to said movable socket whereby the blocking surface of said latching means is displaceable along said arcuate end portion in movement from said latched position to said unlatched position.

7. Apparatus for releasably attaching a cargo tie-down chain as defined in claim 1 further characterized in that said latching means and said first latch releasing lever are supported on said apparatus for pivotal movement about coaxial pivot means and wherein a single spring means is operatively associated with said latching means and said first latch releasing lever for biasing said latching means to a latching position and biasing said first latch releasing lever to an inoperable position.

8. Apparatus for releasably attaching a cargo tie-down chain as defined in claim 7 further characterized in that said first latch releasing lever is pivotally supported on said latching lever and movable relative thereto from said inoperable position to a displaced latch lever releasing position and wherein said first latch releasing lever is operable when moved to said displace latch lever releasing position for effecting pivotal movement of said latching lever and said first latch releasing lever about said coaxial pivot support means to thereby unlatch said movable socket receiving means.

9. Apparatus for releasably attaching a cargo tie-down chain as defined in claim 1 further characterized in that said apparatus includes a connectible end portion adapted to be connected to anchor means and wherein selectively operable adjusting means is operatively associated with said apparatus and said connectible end portion for varying the effective length of said apparatus, said selectively operable adjusting means being operatively associated with said second latch releasing lever for retaining said second latch releasing lever in an inoperable position and wherein said second latch releasing lever includes means operatively associated with said selectively operable adjusted means for latching said adjusting means in selected adjusted positions.

10. Apparatus for releasably attaching a cargo tie-down chain as defined in claim 9 further characterized in that a single spring means is operatively associated with said latching lever and said second latch releasing lever for biasing said latching lever to a latching position relative to said movable socket and for biasing said second latch releasing lever into latching position relative to said selectively operable adjusting means.

11. A quick release cargo tie-down device comprising, in combination:
a. a pair of plate support members;
b. means for attaching said plate support members in spaced parallel relationship;
c. a first block member, said first block member including means defining a receiving socket detailed in dimensions for receiving at least a portion of one arcuate end of a chain link;
d. means for securing said block member in a fixed position between said plate members adjacent one end;
e. a second block member, said second block member including means defining a socket portion detailed in dimension for receiving a second arcuate end portion of said chain link;
f. means pivotally supporting said second block member between said plate members in opposed inwardly directed relationship with said first block member and operable for pivotal movement to a closed position wherein said chain link is trapped and retained between said socket means defined in said fixed block member and said movable block member, and wherein said second block member is movable to an open position whereby said chain link can be released from engagement within said socket means;
g. means on said movable block member for defining a projecting latching surface;
h. a latching lever having a shaped surface portion detailed for latching engagement with said projecting latching surface of said movable block member;
i. means for pivotally supporting said latching lever between said plate members whereby said latching lever can be moved to a latched position with said shaped latching surface in latching engagement with said projecting latching surface of said movable block member and wherein said latching lever can be moved to a displaced unlatched position;
j. a first latch releasing lever, means for supporting said first latch releasing lever between said plate members for coaxial pivoting movement relative to said latching lever, and wherein said first latch releasing lever is operable for moving said latching lever to said unlatched position in response to pivotal displacement of said first latch releasing lever about said coaxial pivot means;
k. a second latch releasing lever supported between said plate means for coaxial pivotal movement relative to said first latch releasing lever and said latching lever, said second latch releasing lever being operable for effecting pivotal movement of said latching lever to said unlatched position; and
l. a single spring means operatively associated with said latching lever, said first latch releasing lever and said second latch releasing lever for respectively biasing said latching lever to a latched position and for biasing said first and second latch releasing levers to inoperable position.

12. A quick release cargo tie-down device as defined in claim 11 further characterized in that said plate members include means for defining an internally threaded opening adjacent an opposite end from said block members, a complementary externally threaded hook member threadably received within said internally threaded opening, said means defining said internally threaded opening being selectively adjustable relative to said cargo tie-down device for varying the effective length of said hook means, and wherein said selectively adjustable means is operatively associated with said first latch releasing lever for maintaining said first latch releasing lever in an inoperable position, with said first latch releasing lever being operatively associated with said selectively adjustable means for maintaining said selectively adjustable means in a selected adjusted position.

13. A quick release cargo tie-down device for use in securing a tie-down chain in position relative to stationary anchor means comprising in combination:
 a. a pair of support plate members;
 b. a first block member, said first block member including means defining a recessed socket portion detailed in dimension for receiving an arcuate end portion of a chain link;
 c. means for securing said first block member in a fixed position between said plate members;
 d. a second block member, said second block member including means defining a recessed socket portion detailed in dimension for receiving an arcuate end portion of a chain link;
 e. means for pivotally attaching said second block member to said first block member whereby said receiving sockets are in opposed inwardly directed relationship and wherein said second block member can be moved from an opened position permitting a chain link to be inserted in position between said opposed sockets, with said second block member being movable to a closed position and operable in said closed position for engaging and retaining a chain link;
 f. means on said second pivotally movable block member for defining a projecting latching surface means;
 g. a latching lever, including means for pivotally supporting said latching lever between said pair of plate members, with said latching lever including a shaped latching surface, said latching lever being pivotally movable about said pivot means for displacement from a latched position in engagement with said projecting latching surface and a displaced position disengaged from said projecting latching surface;
 h. a first latch releasing lever pivotally supported between said plate members for coaxial pivotal movement about said pivot pin means, with said first latch releasing lever being operable for effecting displacement of said latching lever to said disengaged latch releasing position;
 i. a second latch releasing lever supported between said plate members for pivotal movement about said latching lever pivot means, said second latch releasing lever being operable for effecting pivotal displacement of said latching lever to said displaced latch releasing position; and
 j. a single spring means operatively associated with said latching lever and said first and second latch releasing levers for spring biasing said latching lever to said latched position and for spring biasing said two latch releasing levers to displaced inoperable positions.

* * * * *